(12) United States Patent
Schultz et al.

(10) Patent No.: US 10,546,322 B2
(45) Date of Patent: Jan. 28, 2020

(54) ADVERTISEMENTS FOR APPLICATIONS ON AN ONLINE SOCIAL NETWORK

(71) Applicant: Facebook, Inc., Menlo Park, CA (US)

(72) Inventors: Alexander Paul Schultz, San Francisco, CA (US); Thomas Alison, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/418,512

(22) Filed: May 21, 2019

(65) Prior Publication Data

US 2019/0272562 A1    Sep. 5, 2019

Related U.S. Application Data

(63) Continuation of application No. 15/241,730, filed on Aug. 19, 2016, now Pat. No. 10,346,875, which is a continuation of application No. 14/743,956, filed on Jun. 18, 2015, now Pat. No. 9,460,476, which is a continuation of application No. 14/296,022, filed on Jun. 4, 2014, now Pat. No. 9,105,052, which is a continuation of application No. 13/328,958, filed on Dec. 16, 2011, now Pat. No. 8,788,340.

(51) Int. Cl.
| | |
|---|---|
| *G06Q 30/00* | (2012.01) |
| *G06Q 30/02* | (2012.01) |
| *G06F 16/00* | (2019.01) |
| *H04L 29/08* | (2006.01) |
| *G06Q 50/00* | (2012.01) |

(52) U.S. Cl.
CPC ......... *G06Q 30/0255* (2013.01); *G06F 16/00* (2019.01); *G06Q 30/02* (2013.01); *G06Q 30/0201* (2013.01); *G06Q 30/0269* (2013.01); *G06Q 30/0276* (2013.01); *G06Q 30/0277* (2013.01); *G06Q 50/01* (2013.01); *H04L 67/22* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 7,478,078 B2 * | 1/2009 | Lunt | G06Q 30/02 |
| 7,689,682 B1 * | 3/2010 | Eldering | G06Q 40/00 |
| | | | 709/223 |
| 8,055,664 B2 * | 11/2011 | Baluja | G06N 5/02 |
| | | | 707/749 |
| 8,145,679 B1 * | 3/2012 | Baluja | G06Q 30/02 |
| | | | 707/802 |
| 8,239,418 B1 * | 8/2012 | Baluja | G06Q 30/02 |
| | | | 707/796 |

(Continued)

*Primary Examiner* — Gurkanwaljit Singh
(74) *Attorney, Agent, or Firm* — Baker Botts L.L.P.

(57) ABSTRACT

In one embodiment, a social-networking system identifies a plurality of third-party applications associated with an online social network, wherein each identified third-party application has one or more connections to users of the online social network, determines a value representing a social relevance of each identified third-party application, wherein the social relevance value is based on one or more connection factors associated with the one or more third-party application connections, selects one of the identified third-party applications based on its determined social relevance value, and generates an advertisement for the selected third-party application.

20 Claims, 6 Drawing Sheets

(56) References Cited

U.S. PATENT DOCUMENTS

| | | | |
|---|---|---|---|
| 8,266,007 B2* | 9/2012 | Calabria | G06Q 10/10 705/26.1 |
| 8,306,922 B1* | 11/2012 | Kunal | G06Q 50/01 705/319 |
| 8,311,950 B1* | 11/2012 | Kunal | G06Q 30/0201 705/319 |
| 2006/0004789 A1* | 1/2006 | Lunt | G06Q 30/02 |
| 2007/0106551 A1* | 5/2007 | McGucken | G06Q 30/02 705/7.29 |
| 2007/0226248 A1* | 9/2007 | Darr | G06Q 10/10 |
| 2008/0045236 A1* | 2/2008 | Nahon | H04W 4/12 455/456.1 |
| 2009/0144075 A1* | 6/2009 | Flinn | G06N 5/048 705/318 |
| 2010/0217670 A1* | 8/2010 | Reis | G06Q 30/02 705/14.53 |
| 2010/0235307 A1* | 9/2010 | Sweeney | G06N 5/02 706/12 |
| 2011/0093336 A1* | 4/2011 | Calabria | G06Q 10/10 705/14.53 |
| 2011/0314006 A1* | 12/2011 | Sweeney | G06F 17/2785 707/723 |
| 2012/0179642 A1* | 7/2012 | Sweeney | G06F 17/2785 706/55 |
| 2012/0278387 A1* | 11/2012 | Garcia | G06Q 50/01 709/204 |
| 2012/0310747 A1* | 12/2012 | Calabria | G06Q 10/10 705/14.67 |
| 2012/0324027 A1* | 12/2012 | Vaynblat | G06Q 50/01 709/206 |
| 2013/0080526 A1* | 3/2013 | Gill | G06Q 10/10 709/204 |
| 2013/0097180 A1* | 4/2013 | Tseng | G06F 16/955 707/748 |
| 2013/0124538 A1* | 5/2013 | Lee | H04L 63/105 707/749 |
| 2013/0124542 A1* | 5/2013 | Lee | G06Q 50/01 707/751 |
| 2013/0144899 A1* | 6/2013 | Lee | G06Q 50/01 707/759 |

* cited by examiner

ADVERTISEMENTS FOR APPLICATIONS ON AN ONLINE SOCIAL NETWORK

PRIORITY

This application is a continuation under 35 U.S.C. § 120 of U.S. patent application Ser. No. 15/241730, filed 19 Aug. 2016, which is a continuation under 35 U.S.C. § 120 of U.S. patent application Ser. No. 14/743956, filed 18 Jun. 2015, which is a continuation under 35 U.S.C. § 120 of U.S. patent application Ser. No. 14/296022, filed 4 Jun. 2014, which is a continuation under 35 U.S.C. § 120 of U.S. patent application Ser. No. 13/328958, filed 16 Dec. 2011, each of which is incorporated herein by reference.

TECHNICAL FIELD

This disclosure generally relates to social graphs.

BACKGROUND

A social-networking system, such as a social-networking website, enables its users to interact with it and with each other through the system. The social-networking system may create and store a record, often referred to as a user profile, in connection with the user. The user profile may include a user's demographic information, communication channel information, and personal interests. The social-networking system may also create and store a record of a user's relationship with other users in the social-networking system (e.g., social graph), as well as provide services (e.g., wall-posts, photo-sharing, event organization, messaging, games, or advertisements) to facilitate social interaction between users in the social-networking system. The social-networking system may transmit contents and messages related to its services to a user's client device over a network.

DESCRIPTION OF EXAMPLE EMBODIMENTS

Figure 1:
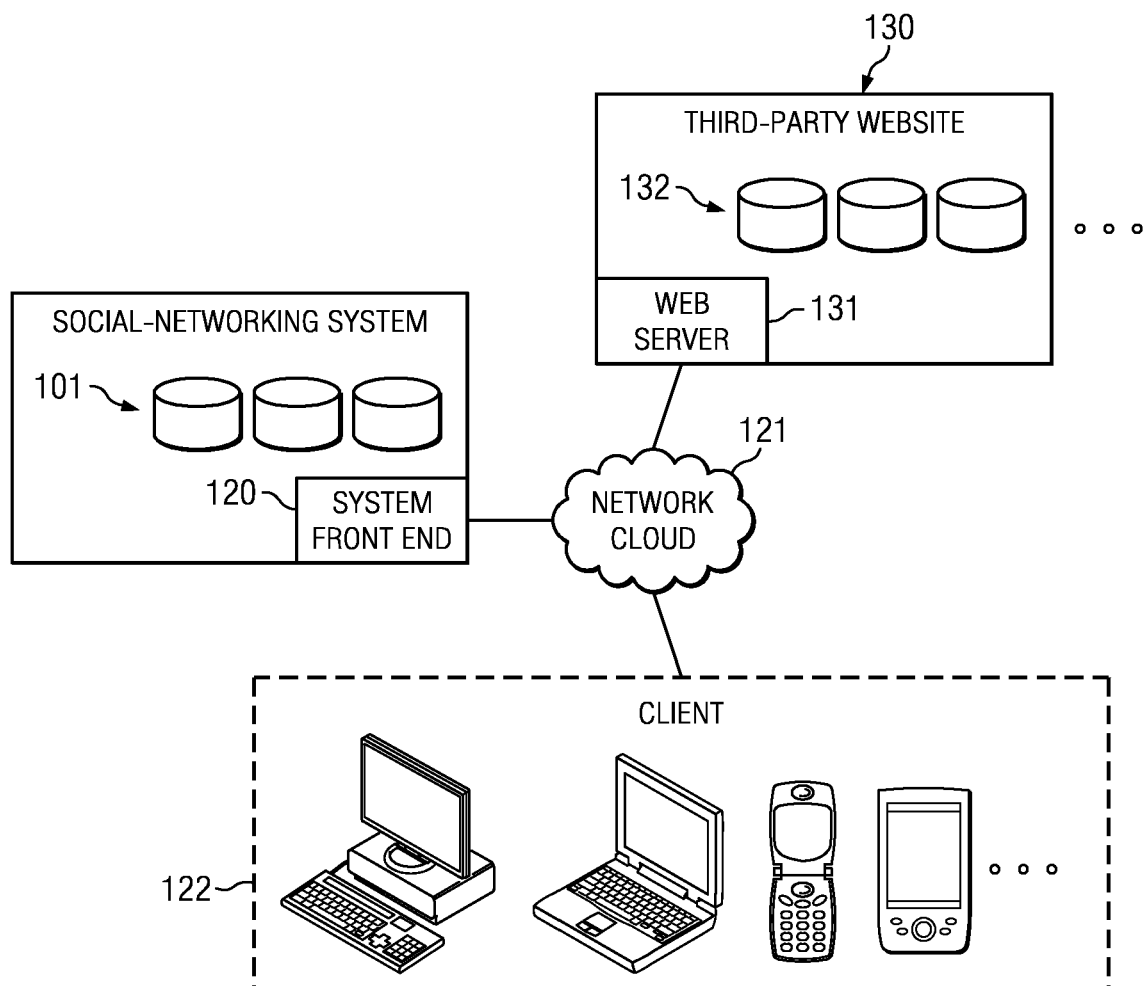
FIG. 1 illustrates an example network environment of an example social-networking system.

FIG. 1 illustrates an example network environment of an example social-networking system. In particular embodiments, a social-networking system may comprise one or more data stores 101. As an example and not by way of limitation, the social-networking system may store user-profile data and social-graph information in data stores 101. In particular embodiments, each data store 101 may comprise one or more storage devices. In particular embodiments, the social-networking system may comprise one or more computing devices (such as, for example, servers) hosting functionality directed to operation of the social-networking system. In particular embodiments, one or more of data stores 101 may be operably connected to the social-networking system's front end 120. As an example and not by way of limitation, front end 120 may be implemented in software programs hosted by one or more computing devices of the social-networking system. A user of the social-networking system may access the social-networking system using client device 122. In particular embodiments, front end 120 may interact with client device 122 through network cloud 121. Network cloud 121 may represent a network or collection of networks (such as the Internet, a corporate intranet, a virtual private network, a local area network, a wireless local area network, a cellular network, a wide area network, a metropolitan area network, or a combination of two or more such networks) over which client devices 122 may access the social network system. In particular embodiments, client device 122 may be a computer or computing device including functionality for communicating (e.g., remotely) over a computer network. As an example and not by way of limitation, client device 122 may be a desktop computer, laptop computer, personal digital assistant (PDA), in- or out-of-car navigation system, smart phone or other cellular or mobile phone, mobile gaming device, another suitable computing device, or two or more such computing devices. In particular embodiments, client device 122 may execute one or more client applications, such as a web browser or special-purpose client application (e.g., Facebook Mobile for smart phones, etc.), to access and view content over a computer network. In particular embodiments, front end 120 may include web or HTTP server functionality, as well as other functionality, to allow users to access the social-networking system.

In particular embodiments, users of a social-networking system may access other websites or third-party websites. As an example and not by way of limitation, a user using client device 122 may connect to and communicate with third-party website 130 through network cloud 121. Third-party website 130 may comprise web server 131 operatively connected to one or more data stores 132 storing user data and webpage information. User data may include, for example, user name, user profile picture, and user profile information (e.g., location, affiliation, interest). Webpage information may include, for example, page-layout information, scripts, webpage content such as text (e.g., ASCII or HTML), media data (e.g., graphics, photos, video clips), and executable code objects (e.g., a game executable within a browser window or frame). In particular embodiments, a user may use a web browser or special-purpose client application hosted on client device 122 to access their party website 130 by sending an HTTP request to web server 131, causing web server 131 to access the one or more data stores 132 and construct one or more webpages or frames displayed in the web browser or the special-purpose client application.

A social-networking system may communicate and access third-party website 130, and vice versa, through network cloud 121. As an example and not by way of limitation, a webpage constructed by third-party website 130 for a user of a social-networking system may contain information from the social-networking system, such as a frame displaying profile pictures of the user's first-degree friends who are currently active on third-party website 130. As an example and not by way of limitation, a user's user-profile page of a social-networking system may contain an embedded video clip that the user posted on third-party website 130. In particular embodiments, a webpage constructed by a first website may include one or more inline references that cause the client device 122 to access and display content from a second website by incorporating in the webpage's HTML document Uniform Resource Locations (URLs) and/or script code (e.g., JavaScript, PHP, AJAX) that causes a client application hosted on the client device 122 to access the second website to dynamically provide content specified by the script code (e.g., profile pictures). In particular embodiments, a browser cookie installed by a second website on client device 122 may be used to facilitate accessing the second website. As an example and not by way of limitation, requests transmitted to the social-networking system for a particular user may include a browser cookie or other token to enable authentication and access to the social-networking system for the particular user (such as, for example, to access and display profile pictures of the particular user's first-degree friends), without the particular user having to manually enter user identification (ID) and password information of the social-networking system.

Figure 2:
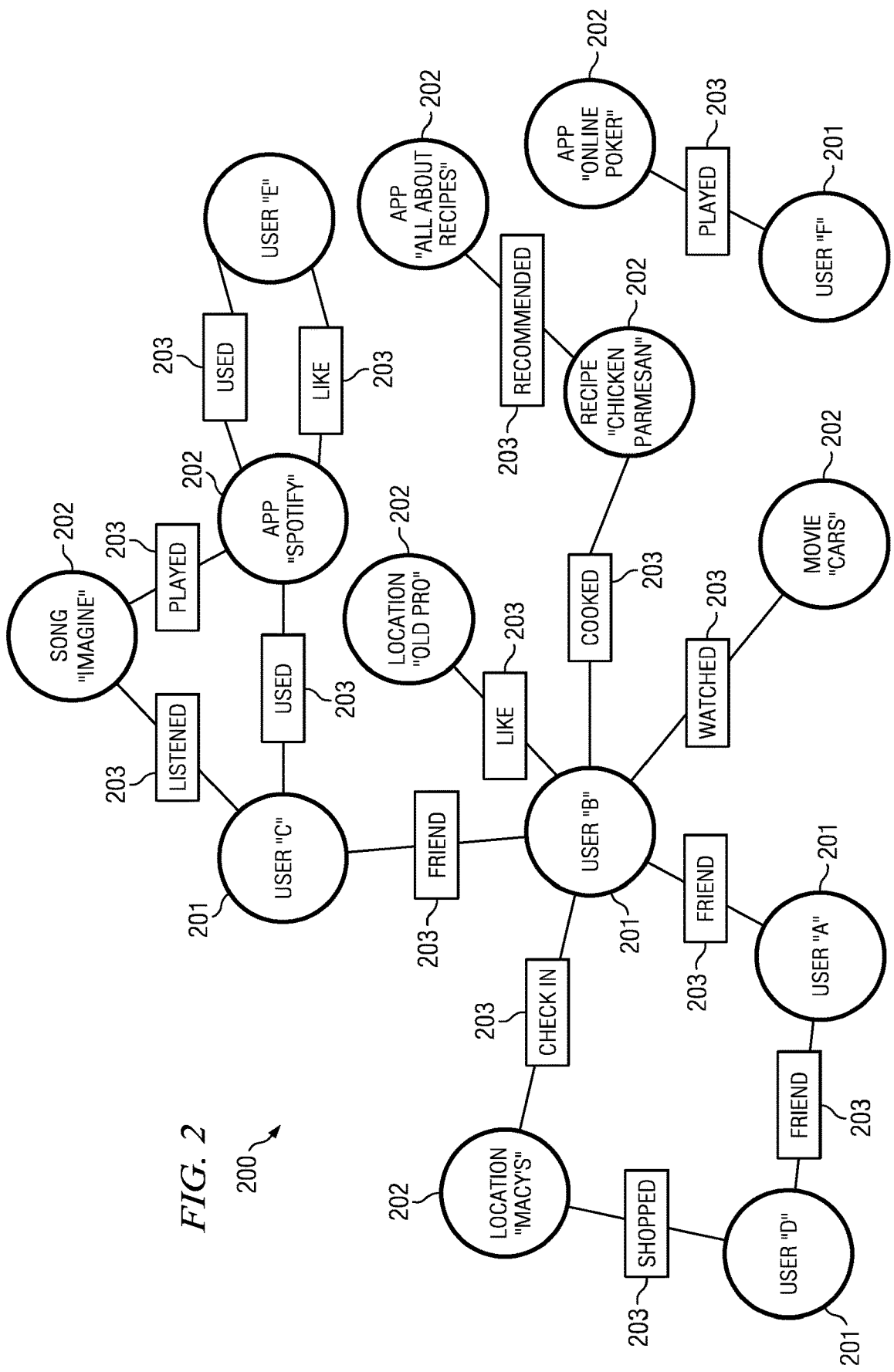
FIG. 2 illustrates an example social graph.

A social-networking system may store records of users and relationships between users in one or more social graphs. FIG. 2 illustrates an example social graph 200. In particular embodiments, the social-networking system may store social graph 200 in data stores 101. In particular embodiments, social graph 200 may comprise a plurality of user nodes 201, a plurality of concept nodes 202, and a plurality of edges 203 between nodes.

In particular embodiments, each user node 201 may correspond to a user of the social-networking system. As an example and not by way of limitation, when a user registers for an account with the social-networking system, the social-networking system may create a user node 201 corresponding to the user, and store the user node 201 in one or more data stores 101. In particular embodiments, the user node 201 may comprise information provided by the user and information gathered by various systems, including the social-networking system. As an example and not by way of limitation, the user may provide his name, profile picture, contact information, birth date, gender, marital status, family status, employment, education background, preferences, interests, or other demographical information to be included in the user node 201. In particular embodiments, each user node 201 may comprise one or more data objects corresponding to information associated with a user. In particular embodiments, each user node 201 may correspond to one or more webpages or one or more user profile pages. As an example and not by way of limitation, in response to a request including a user identifier of a particular user, system front end 120 may access a corresponding user node based on the user identifier, and construct a user-profile page comprising a name, a profile picture, and interests of the particular user.

In particular embodiments, each concept node 202 may correspond to a concept of the social-networking system. As an example and not by way of limitation, a concept may correspond to a place (such as, for example, a movie theater, a restaurant, a landmark, or a city), a website (such as, for example, a website associated with the social-network system or a third-party website), an entity (such as, for example, a person, a business, a group, a sports team, or a celebrity), real or intellectual property (such as, for example, a sculpture, a painting, a movie, a game, a song, an idea, a photograph, or a written work), an application, a game, an idea or theory, another suitable concept, or two or more such concepts. An administrative user of a concept (such as, for example, the owner or administrator of the concept) may create a concept nodes by providing information of the concept (e.g., by filling out an online form), causing the social-networking system to create a corresponding concept node, and store the concept node in one or more of data stores 101. A concept node 202 may comprise information of a concept provided by an administrative user of the concept and information gathered by various systems, including the social-networking system. As an example and not by way of limitation, information of a concept may include as a name or a title, one or more images (e.g., an image of cover page of a book), a location (e.g., an address, a geographical location), a website (e.g., an URL address), contact information (e.g., a phone number, an email address), other suitable concept information, or any combination of such information. In particular embodiments, each concept node 202 may comprise one or more data objects corresponding to information associated with the concept node 202. In particular embodiments, each concept node 202 may correspond to a webpage. As an example and not by way of limitation, in response to a request including a name (or an URL address), the social-networking system may access a corresponding concept node (stored in one or more of data stores 101) based on the name, and construct a webpage comprising the name, one or more images, and contact information of the concept.

In particular embodiments, an edge 203 connecting a pair of nodes may represent a relationship between the pair of nodes. In particular embodiments, each edge 203 may comprise or represent one or more data objects or attributes corresponding to the relationship between a pair of nodes. As an example and not by way of limitation, a first user may indicate that a second user is a "friend" of the first user. In response to this indication, the social-networking system may transmit a "friend request" to the second user. If the second user confirms the "friend request," the social-networking system may create an edge connecting the first user and the second user in social graph 200, and store the edge in one or more of data stores 101. In the example of FIG. 2, social graph 200 includes an edge indicating a friend relation between user nodes of user "A" and user "B", and an edge indicating a friend relation between user nodes of user "C" and user "B." Although this disclosure describes and FIG. 2 illustrates edges with particular attributes connecting user nodes, this disclosure contemplates edges with any suitable attributes connecting user nodes. As an example and not by way of limitation, an edge may represent a friendship, a business relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In particular embodiments, the social-networking system may create an edge between a user node and a concept node in social graph 200. As an example and not by way of limitation, a user viewing the webpages 300 (such as, for example, by using a web browser or a special-purpose application hosted by the user's client device 122) may indicate that he likes the concept represented by the concept node by selecting "Like" icon 301 (such as, for example, by clicking on the icon), which may cause client device 122 to transmit to the social-networking system a message indicating the user's liking of the sports bar associated with the webpage 300. In response to the message, the social-networking system may create an edge between the user and the concept node, as illustrated by the "like" edge 203 between the user node of user "B" and the concept node of sports bar "Old Pro" in FIG. 2. In particular embodiments, the social-networking system may store the edge in one or more of data stores 101. Although this disclosure describes forming edges in a particular manner, this disclosure contemplates forming edges in any suitable manner. As an example and not by way of limitation, rather than visiting webpage 300 and clicking an icon, a user may use a mobile application or another suitable application that is operable to form an edge between the user's user node and a concept node. As another example and not by way of limitation, an edge may be automatically formed by the social-networking system in response to particular user actions. For example, if a first user uploads a picture, watches a movie, or listens to a song, an edge may be formed between the user node corresponding to the first user and the concept nodes corresponding to those concepts. Moreover, although this disclosure describes particular types of edges, this disclosure contemplates any suitable types of edges, including but not limited to those representing any characterization by the user of the concept or vice versa, any indication of a state of a relationship or association between the user and the concept, any information regarding an interaction between the user and the concept, or any other representation of information related to both the user and the concept.

Social graph 200 may comprise other types of edges between a user node and a concept node. In particular embodiments, an edge between a user node and a concept node may represent a particular action or activity performed by a user of the user node toward a concept of the concept node. As an example and not by way of limitation, in addition to a user (user "B") liking a sports bar ("Old Pro"), a user (user "B") may check-in to a place ("Old Pro"), as illustrated in FIG. 2. The webpage 300 corresponding to a concept node may include, for example, a selectable "check in" icon 302 or a selectable "add to favorites" icon 303. Similarly, by clicking on these icons, the social-networking system may create a "favorite" edge or a "check in" edge (as illustrated in FIG. 2) in response to a user's action corresponding to a respective action. As another example and not by way of limitation, a user (user "C") may listen to a particular song ("Imagine") using a particular application (SPOTIFY, which is an online music application). In this case, the social-networking system may create a "listened" edge and a "used" edge (as illustrated in FIG. 2) between the user nodes corresponding to the user and the concept nodes corresponding to the song and application to indicate that the user listened to the song and used the application. Moreover, the social-networking system may create a "played" edge (again, as illustrated in FIG. 2) between the concept nodes corresponding to the song and the application to indicate that the particular song was played by the particular application. Although this disclosure describes edges with particular attributes connecting user nodes and concept nodes, this disclosure contemplates edges with any suitable attributes connecting user nodes and concept nodes. Moreover, although this disclosure describes edges between a user node and a concept node representing a single relationship, this disclosure contemplates edges between a user node and a concept node representing one or more relationships. As an example and not by way of limitation, an edge may represent both that a user likes and has used at a particular concept. Alternatively, a separate edge could be generated to represent each type of relationship (or multiples of a single relationship) between a user node and a concept node, as illustrated in FIG. 2 between the user node for user "E" and the concept node for "SPOTIFY."

In particular embodiments, a concept node may represent a third-party webpage hosted by third party website 130. The third-party webpage may include a selectable icon (e.g., implemented in JavaScript, AJAX, or PHP codes) representing an action or activity. As an example and not by way of limitation, a third-party webpage for the "Old Pro" about The Old Pro Sports Bar in Palo Alto, California, may include a selectable icon such as "like" or "check in," like the webpage 300 illustrated in FIG. 3A, or may include selectable icons such as, for example, "eat," "recommend," or any other suitable action or activity. A user viewing the third-party webpage may perform an action by selecting one of the icons (e.g., "eat"), causing client device 122 to transmit to the social-networking system a message indicating the user's action (e.g., eating at "Old Pro"). If a concept node corresponding to the third-party webpage exists in social graph 200, in response to the message, the social networking system may create an edge (e.g., an "eat" edge) between a user node corresponding to the user and the concept node corresponding to the third-party webpage, and store the edge in one or more of data store 101. If a concept node corresponding to the third-party webpage does not exist in social graph 200, in response to the message, the social networking system may create a concept node corresponding to the third-party webpage, create an edge (e.g., an "eat" edge) between the newly-created concept node and a user node corresponding to the user, and store the concept node and the edge in one or more of data stores 101.

In particular embodiments, a particular concept may correspond to one or more concept nodes 202. A social graph may comprise a plurality of concept nodes corresponding to a same concept (e.g., a same real-world entity). That is, each concept node of the several concept nodes may correspond to a different webpage that is about the same concept. As an example and not by way of limitation, a popular celebrity or restaurant may have several webpages, such as, for example, a "fan page," an "official page," or a "review page," authored by various users.

Figure 3A:
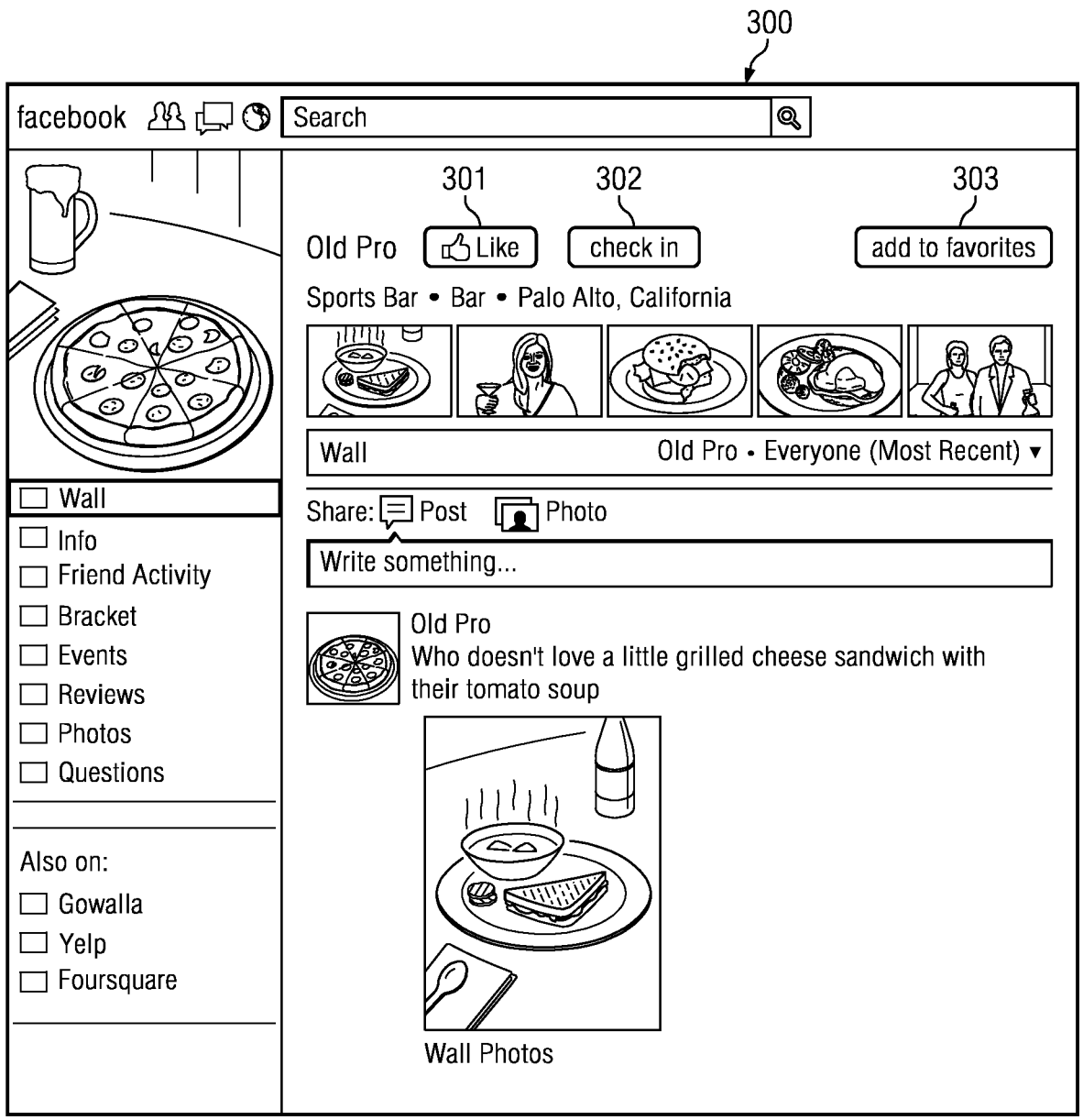
FIGS. 3A-3B illustrate example webpages associated with concept nodes.
Figure 3B:
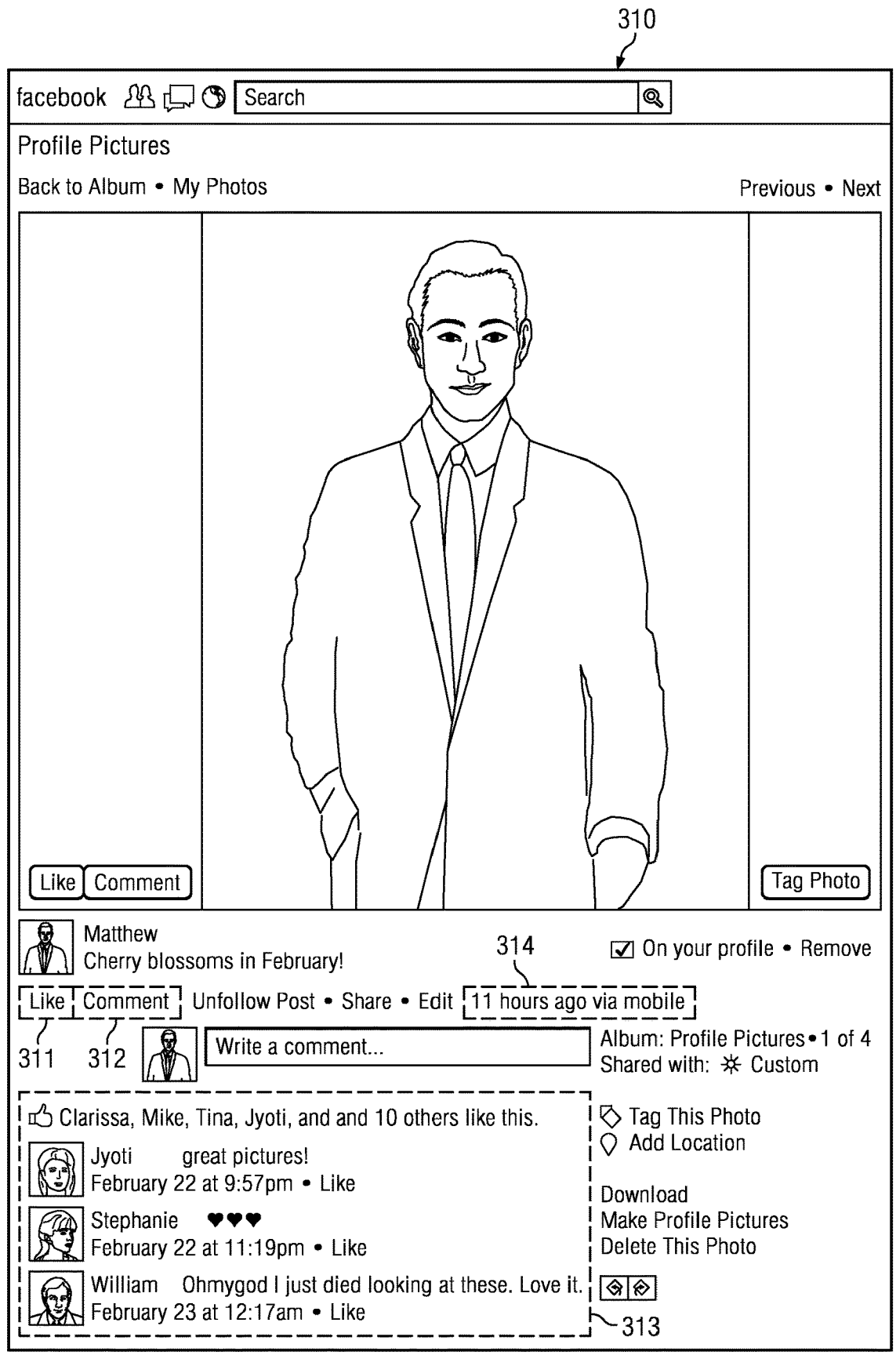

FIGS. 3A-3B illustrate example webpages associated with concept nodes. In particular embodiments, the social-networking system may construct a webpage corresponding to a concept node. As an example and not by way of limitation, FIG. 3A illustrates a webpage 300 for the "Old Pro," a sports bar in Palo Alto, California. The webpage 300 may include, for example, a selectable "Like" icon 301, a selectable "check in" icon 302, a selectable "add to favorites" icon 303, other suitable components, or two or more such components. As an example and not by way of limitation, FIG. 3B illustrates a webpage 310 for the picture of "Matthew." The webpage 310 may include, for example, a selectable "Like" icon 311, a selectable "Comment" icon 312, a history of comments and "likes" from various users in field 313, an indication of the application corresponding to the concept node in field 314, other suitable components, or two or more such components. Although this disclosure describes and FIGS. 3A-3B illustrate particular webpages associated with particular concept nodes, this disclosure contemplates any suitable webpages associated with any suitable concept nodes. Moreover, although this disclosure describes concept nodes being associated with webpages, this disclosure contemplates concept nodes that are not necessarily associated with webpages. As an example and not by way of limitation, a concept node may correspond to a song or other musical work that it not associated with any particular webpage.

In particular embodiments, social graph 200 may be used to determine which concepts (corresponding to particular concept nodes) are relevant to particular users (corresponding to particular user nodes). Concept nodes that are connected to a particular user node (i.e., directly by an edge) may be considered relevant to the user node. As an example and not by way of limitation, a concept node connected by an edge to a first user node may be considered relevant to the first user node. As used herein, when referencing a social graph the term "connected" means a path exists within the social graph between two nodes, wherein the path may comprise one or more edges and zero or more intermediary nodes. The term "directly connected" means the path between two nodes in the social graph comprises a single edge. Similarly, the term "indirectly connected" means the path between two nodes in the social graph comprises two or more edges and one or more intermediary nodes. In particular embodiments, concept nodes that are not connected to a particular user node, but instead are indirectly connected via one or more intervening nodes, may also be considered relevant to the user node. As an example and not by way of limitation, a concept node indirectly connected to second user node (via a path comprising one or more intervening nodes) may be considered relevant to a first user node if the second user node is an Nth-degree friend of the first user node. Furthermore, in particular embodiments, the closer a second user node is to the first user node, the more relevant the concept nodes connected to the second node may be considered to the first user node. That is, the fewer edges separating the first user node from a particular concept node, the more relevant that concept node may be considered to the first user node. As an example and not by way of limitation, as illustrated in FIG. 2, the concept node "Old Pro" is connected to the user node for User "B," and thus the concept "Old Pro" may be considered relevant to User "B." As another example and not by way of limitation, the concept node "SPOTIFY" is indirectly connected to the user node for User "B" via the intermediated user node for User "C," and thus the concept "SPOTIFY" may be considered relevant to User "B," but because the concept node is not directly connected to the user node for User "B," it may be considered less relevant than a concept node that is directly connected to the user node for User "B." As yet another example and not by way of limitation, the concept node for "Online Poker" (which is an online multiplayer game) is not connected to the user node for User "B" by any pathway in social graph 200, and thus the concept "Online Poker" may not be considered relevant to User "B." Although this disclosure describes determining whether particular concept nodes are relevant to particular user nodes in a particular manner, this disclosure contemplates determining whether any suitable concept nodes are relevant to any suitable user nodes in any suitable manner.

In particular embodiments, the social-networking system may identify a set of concept nodes associated with an application ("app") that is accessible by users associated with the online social network and reference one or more of those concept nodes when generating an advertisement for the application. Thus, an advertisement for a particular application can be customized to a particular user by referencing the user's social network and by referencing content related to the application that the user's friends have accessed. An application accessible by users associated with the online social network may include, for example, a website, an online service, an app for accessing, creating, or managing content, an app for playing online games, an app for accessing, creating, or managing content from a mobile client system, an app for conducting search queries, an app for handling email or other digital messaging systems, a web browser app, an app for viewing advertisements, another suitable app, or an app with any suitable combination of these capabilities. In particular embodiments, an application may be associated with particular concept nodes. As an example and not by way of limitation, an application may be able to access, create, or manage particular types of content, such as audio files, video files, pictures/graphics, text, or any combination thereof. Each piece of content that is accessed, created, or managed by an application may have a corresponding concept node. Thus, particular content may be associated with particular applications in the social graph. As an example and not by way of limitation, a video player application may correspond to a first concept node, and one or more videos that can be accessed and viewed using the video player may correspond to one or more second concept nodes, respectively. As another example and not by way of limitation, a camera application may correspond to a first concept node, and one or more photographs created with the camera application may correspond to one or more second concept nodes. Although this disclosure describes particular applications, this disclosure contemplates any suitable applications. Moreover, although this disclosure describes particular types of content, this disclosure contemplates any suitable types of content.

Figure 4:
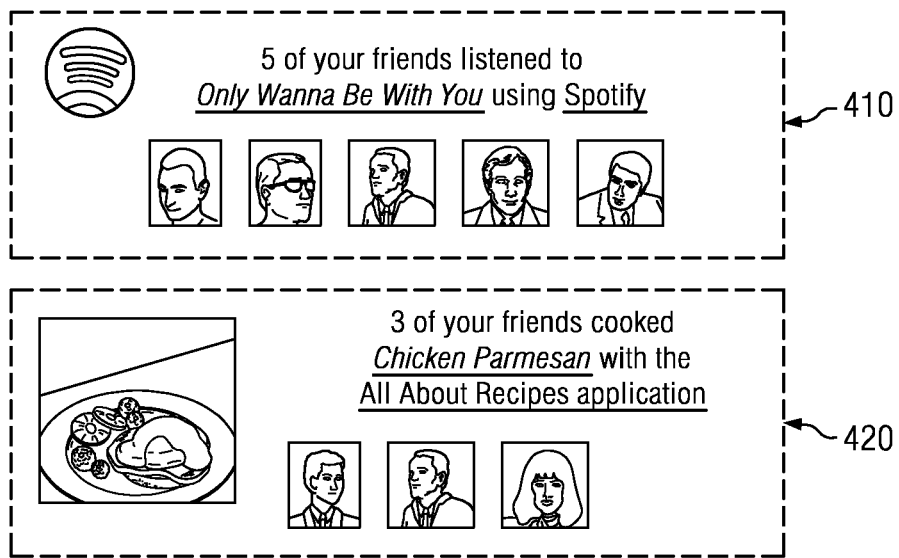
FIG. 4 illustrates example advertisements.

FIG. 4 illustrates example advertisements for applications. In particular embodiments, the social-networking system may identify one or more concept nodes associated with an application, identify friends of a user that have used that application, and then generate an advertisement for the application directed to the user that references the concept nodes and/or the friends of the user. As an example and not by way of limitation, the social-networking system may generate an advertisement 410 for the music application "SPOTIFY." The advertisement 410 references the song "Only Wanna Be With You," and indicates that 5 of the user's friends have listened to the song using the "SPOTIFY" app. The advertisement 410 also includes thumbnail profile pictures of the 5 friends of the user that have used the "SPOTIFY" app to listen to "Only Wanna Be With You." Thus, this advertisement for "SPOTIFY" has been customized for the user by referencing the user's friends that have used the "SPOTIFY" application and by referencing the content they accessed with the application. As another example any not by way of limitation, the social-networking system may generate an advertisement 420 for the recipe application "All About Recipes." The advertisement 420 references the recipe for "Chicken Parmesan" and indicates that 3 of the user's friends have used the recipe (i.e., "cooked Chicken Parmesan") that they accessed with the "All About Recipes" application. The advertisement 420 also includes thumbnail profile pictures of the 3 friends of the user that have used the "All About Recipes" application to cook "Chicken Parmesan." Thus, this advertisement for "All About Recipes" has been customized for the user by referencing the user's friends that have used the "All About Recipes" application and by referencing the content they accessed with the application. Although this disclosure describes and illustrates in FIG. 4 particular types of advertisements, this disclosure contemplates any suitable types of advertisements. Moreover, although this disclosure describes and illustrates in FIG. 4 advertisements with particular content, this disclosure contemplates advertisements with any suitable content.

In particular embodiments, the social-networking system may then analyze the concept nodes in the social graph 200 to identify one or more concept nodes associated with an application that are connected to one or more user nodes corresponding to friends of a first user. In other words, in order to make a socially relevant advertisement for a particular application directed at a particular user, the social-networking system may identify a concept that is connected to both the application and the friends of the first user. In particular embodiments, the social-networking system may first identify a particular concept node that is associated with a particular application. The social-networking system may also analyze the number and type of edges connected to each concept node. As an example and not by way of limitation, the social-networking system may identify the number of "friend" edges, "used" edges, "check in" edges, "like" edges, or other suitable types of edges connected to a particular concept node. The social-networking system may then identify a first set of edges comprising all the edges connected to the concept node. Out of this first set of edges, the social-networking system may then identify a second set of edges comprising the edges that are connected to user nodes corresponding to friends of a first user. The identify edges may then be references when subsequently selecting concept nodes to be referenced in advertisements directed to the first user. As an example and not by way of limitation, referencing FIG. 2, if the social-networking system were generating an advertisement for the "SPOTIFY" application directed at User "B," the social-networking system may first identify friends of User "B" who have used the application. In this case, User "C" has used the "SPOTIFY" application. The social-networking system may then identify any concepts associated with the application that are also connected to User "C." In this case, the song "Imagine" is associated with the "SPOTIFY" application (i.e., it has been "played" by the app) and is connected to User "C" (i.e., he has "listened" to the song). The social-networking system may then select the "Imagine" concept and generate an advertisement direct to User "B" for the "SPOTIFY" application that includes information that User "C" has listened to the song "Imagine" on "SPOTIFY." This advertisement should be socially relevant to User "B," since User "C" is a first-degree friend of User "B." Although this disclosure describes identifying particular concept nodes in a particular manner, this disclosure contemplates identifying any suitable concept any suitable manner.

In particular embodiments, the social-networking system may select a concept node based on the social relevancy of the concept node to a first user. A concept node that is directly connected to a first user, or connected to friends of the first user, may be considered socially relevant to the first user. A concept node that is connected to a more distant friend of the first user (e.g., 2nd-degree friends, 3rd-degree friends, and so on) may be considered less socially relevant to the first user. Finally, a concept node that is not connected to the first user node by any path in the social graph may be considered minimally or not socially relevant to the first user. In particular embodiments, the social-networking system may identify a set of edges between a concept node and user nodes corresponding to friends of a first user node and then select the concept node based on the set of edges. Concept nodes that are directly connected to the user nodes corresponding to friends of the first user may be considered more relevant than concept nodes that are not connected to user nodes corresponding to friend of the first user. As an example and not by way of limitation, referencing FIG. 2, if User "C" is using the application "SPOTIFY," the concept node for "SPOTIFY" may be considered socially relevant to User "B" because the user node for User "B" is connected to the user node for User "C." As another example and not by way of limitation, when generating an advertisement directed to User "B," the social-networking system may determine that the concept nodes for the app "SPOTIFY" and the song "Imagine" may be considered socially relevant to User "B" because these are connected by "used" and "listened" edges, respectively, to User "C," who is a friend of User "B." Similarly, the concept nodes for "SPOTIFY" and the song "Imagine" may be considered less socially relevant to User "A" because the concept nodes corresponding to "SPOTIFY" and "Imagine" are three-degrees of separation from the user node for User "A." As another example and not by way of limitation, the concept node for the app "Online Poker" may be considered minimally or not socially relevant to User "B" because the concept node corresponding to that app is not connected to User "B" by any path in the social graph 200. As yet another example and not by way of limitation, referencing FIG. 2, if the social-networking system is generating an advertisement directed to User "A" for the app "All About Recipes," the content node for the recipe "Chicken Parmesan" may be considered socially relevant to User "A." In this case, the social-networking system may select the "Chicken Parmesan" concept node to be referenced in the advertisement about the "All About Recipes" app it generates for User "A" because the "Chicken Parmesan" concept node is considered socially relevant to User "A." Although this disclosure describes selecting concept nodes based on social relevancy in a particular manner, this disclosure contemplates selecting concept nodes based on social relevancy in any suitable manner.

In particular embodiments, the social-networking system may select a concept node based information associated with the edges between the concept node and one or more user nodes corresponding to friends of a first user. The information associated with the edges may be the number of edges, the type of edge, or the attributes of the edges that connect a user node to a concept node. A concept node connected by edges to more friends of the first user (i.e., a concept node with more edges connecting the concept node to user nodes corresponding to friends of the first user) may be considered more relevant than concept nodes with fewer edges. As an example and not by way of limitation, if a first concept node has 5 edges connecting it to user nodes corresponding to friends of a first user and a second concept node has 10 edges connecting it to user nodes corresponding to friends of the first user, then the second concept node may be considered more relevant to the first user because more of the first user's friends are connected to it by edges. In this case, the second concept node may be selected by the social-networking system because it is more socially relevant to the first user. In particular embodiments, the social-networking system may select the concept node with the most edge connections from a set of concept nodes. That is, the social-networking system may determine that the concept node that is most socially relevant to a first user is the concept node with the most edges connecting is to user nodes, such as the user nodes corresponding to friends of the first user. As an example and not by way of limitation, the social-networking may identify a first concept node from a first set of concept nodes, where the first concept node has the most edges connecting it to one of more second user nodes. The second user nodes may be user nodes that are within a threshold degree of separation of a first user node. Thus, the social-networking system identifies the concept node that the most of the first user's friends are connected to. If two concept nodes both have the same number of edges connecting to them, then the social-networking system may select both concept nodes, or may look at other factors (such as, for example, the type of edges, or the attributes of the edges) to determine which concept node to select. In particular embodiments, the social-networking system may select a concept node based on the types of edges connecting the concept node to a user's friends. Edges of particular types may be considered more relevant than other types of edges. As an example and not by way of limitation, for a concept node associated with the concept "SPOTIFY," the social-networking system may consider "like" edges to be more relevant than "used" edges. Similarly, while counting a number of edges between a concept node and user nodes that are friends of a first user, the social-networking system may determine that two "like" edges is more relevant than three "used" edges. In particular embodiments, the social-networking system may only select concept nodes that are connected to user nodes that are within a threshold degree of separation of a first user node in the social graph 200. As an example and not by way of limitation, when generating an advertisement directed towards User "A," if the threshold degree of separation is one degree, the social-networking system may determine that the concept node corresponding to the location "Macy's" is relevant because it is connected to user nodes of first-degree friends of User "A," while the concept node corresponding to the application "SPOTIFY" may not be considered relevant because it is indirectly connected to User "A" by a second-degree friend, User "C." Although this disclosure describes selecting concept nodes based on information associated with the edges in a particular manner, this disclosure contemplates selecting concept nodes based on information associated with the edges in any suitable manner.

In particular embodiments, the social-networking system may select a concept node based on advertising sponsorship associated with the concept node. An advertiser (such as, for example, the owner or propriety of a concept corresponding to a concept node) may sponsor a particular concept node such that the concept node is considered more socially relevant by the social networking system. If a first concept node and a second concept node are both considered equally socially relevant to a first user, whichever node has advertising sponsorship may be given an increased social relevance, thus allowing it to be selected. As an example and not by way of limitation, if the owner of the "SPOTIFY" application wants to promote the song "Imagine," this sponsorship may be considered as a factor when selecting the concept node to be references in an advertisement. Although this disclosure describes selecting a concept node based on advertising sponsorship in a particular manner, this disclosure contemplates selecting a concept node based on advertising sponsorship in any suitable manner.

In particular embodiments, the social-networking system may select a concept node based on time stamps associated with the edges connected to the concept node. Edges that were generated more recently may be considered more socially relevant when selecting concept nodes than edges that were generated in the past. As an example and not by way of limitation, the social-networking system may determine that edges created in the past week are the most socially relevant, while edges created in the past month are less socially relevant, and edges created more than a month ago are not considered socially relevant. Although this disclosure describes selecting a concept node based on time stamps associated with edges in a particular manner, this disclosure contemplates selecting a concept node based on time stamps associated with edges in any suitable manner.

In particular embodiments, the social-networking system may select a concept node based on traffic data of the concept node's corresponding webpage. As an example and not by way of limitation, the social-networking system may detect a visit to a concept node's corresponding webpage, such as the webpages illustrated in FIGS. 3A or 3B, when the social-networking system receives a request to serve the corresponding webpage. As an example and not by way of limitation, the social-networking system may detect a visit to a concept node's corresponding webpage when the social-networking system receives a request to serve content of a selectable icon incorporated in the concept node's corresponding webpage. The social-networking system may accumulate and store in one or more of data stores 101 a number of visits to a webpage corresponding to a concept node. The social-networking system may access one or more of data stores 101 for a number of visits for each of the second concept nodes. In particular embodiments, the more that a webpage corresponding to a concept node has been visited, the more socially relevant the concept will be considered. As an example and not by way of limitation, a first concept node corresponding to a first webpage that has been visited for over 10,000 times may be considered more socially relevant than a second concept node corresponding to a second webpage that has only been visited 5,000 times. In particular embodiments, the social-networking system may select a concept node based on traffic from friends of a user. As an example and not by way of limitation, the social-networking system may detect a visit to a concept node's corresponding webpage by one or more second users corresponding to one or more second user nodes, respectively, that are connected to a first user node. In particular embodiments, the more that a webpage corresponding to a concept node has been visited by friends of a user, the more socially relevant the concept will be considered to the user. Although this disclosure describes selecting a concept node based on traffic data in a particular manner, this disclosure contemplates selecting a concept node based on traffic data in any suitable manner.

In particular embodiments, the social-networking system may select a concept node based on the edges connected to the concept node by determining a value for one or more concept nodes based on edges connected to the concept node, and then selecting one or more concept nodes based on the determined values of the concept nodes. The social-networking system may first identify the edges connecting a particular concept node to user nodes corresponding to friends of a first user and then determine a value for the concept node based on the number and types of identified edges connected to the concept node. A particular concept node may be connected to one or more other nodes by one or more edges, and each edge may have particular attributes. The social-networking system may then select particular concept nodes based on the determined values, and then the selected concept nodes may be references in any advertisements generated by the social-networking system. The determined value for a concept node may be based on a variety of factors, such as, for example, the number of edges connected to the concept node, the type of edges connected to the concept node, whether the concept node and the first user are connected by an edge, whether the concept node and user nodes of friends of the first user (or user nodes within a threshold degree of separation of the first user) are connected by edges, when the edges connected to the concept node were created, other suitable information, or any combination of such information. The determined value may be any suitable value on any suitable scale. For illustration purposes, this disclosure discusses values in generic "unit" terms (e.g., 1.0 units, 2.4 units, etc.), this disclosure contemplates values with any suitable type of units. Moreover, for illustration purposes, this disclosure discusses values for concept nodes such that larger values are considered more relevant, such as, for example, when selecting concept nodes for use in an advertisement. In particular embodiments, the social-networking may determine a value for a concept node based on the number of edges connected to the concept node. Concept nodes may be connected to other nodes by one or more edges, and the number of edges connected to a concept node may be considered when determining a value for the concept node. That is, the social-networking system may determine a value for a concept node based on a level of engagement by users, as measured by a number of edges (i.e., actions) between the concept node and user nodes. Concept nodes with more edges may be given a greater value. As an example and not by way of limitation, a concept node with 50 edges may be given a value of 5.0 units, while a concept node with 30 edges may be given a value of 2.4 units. As another example and not by way of limitation, the social-networking system may assign a score of 1.0 units to a concept node if the concept node has more than 100 edges connecting to user nodes, a score of 0.7 units if the concept node has more than 50 edges connecting to user nodes, or a score of 0.5 units if the concept node has 50 edges or less connecting to user nodes. In particular embodiments, the social-networking system may determine a value for a concept node based on the attributes of the edges connected to the concept node. As discussed above, edges may have various attributes, and edges with particular attributes may be given more value than other types of edges. The social-networking system may identify the edges connected to a particular concept node and the attributes of those edges and then determine a value based on the attributes of the edges. As an example and not by way of limitation, for a concept node associated with the app "SPOTIFY," the social-networking system may give more weighting to edges of "like" than edges of "used." While counting a number of edges between a concept node and user nodes, the social-networking system may determine a value for a "like" edge as 1.5 units, while determining a value for a "used" edge as 0.5 units. Although this disclosure describes determine values for a concept node based on edge information in a particular manner, this disclosure contemplates determining values for a concept nodes based on edge information in any suitable manner. Although this disclosure describes determining values for particular concept nodes, this disclosure contemplates determining values for any suitable concept node. Moreover, although this disclosure describes determining particular values for concept nodes, this disclosure contemplates determining any suitable values for concept nodes. Furthermore, although this disclosure describes determining a value for a concept node based on edge connections in a particular manner, this disclosure contemplates determining a value for a concept node based on edge connections in any suitable manner.

In particular embodiments, the social-networking system may determine a value for a concept node based on one or more factors, as described above, including social-graph information, user information, concept information, etc. These determined values may be cumulative with each other. The determined value for each factor may be additive, multiplicative, etc., with determined values for other factors. As an example and not by way of limitation, a social-networking system may give a value of 1.0 to a concept node having 10 or more edges connected to it, and may give a value of 0.8 to a concept node corresponding to concept that has recently been accessed by a friend of the user. Thus, a concept node that has been recently accessed and has 10 or more edges may be given a value of 1.8. In particular embodiments, values determined based on particular factors may be weighted differently. Using the previous example, a concept node with 10 or more edges that has recently been accessed may be given a value of $a*(1.0)+b*(0.8)$, where a and b are weightings that may be assigned to the particular factors. Although this disclosure describes determining discrete values for concept nodes based on particular factors, this disclosure contemplates determining non-discrete values for concept node based on a variety of factors.

In particular embodiments, the social-networking system may generate an advertisement for an application comprising information representing one or more concepts corresponding to one or more concept nodes that have been selected by the social-networking system. The advertisement may be a structured document. The advertisement may include a title, an image, ad copy, a display URL, a destination URL, or any combination thereof. In particular embodiments, the advertisement may include information associated with the content corresponding to the selected concept nodes. Information of particular concept nodes presented to the first user may comprise one or more images and websites associated with the particular concept nodes. As an example and not by way of limitation, the advertisement 410 for the "SPOTIFY" application includes ad copy describing the song "Only Wanna Be With You," which is content associated with the app. As another example and not by way of limitation, the advertisement 420 for the "All About Recipes" application includes ad copy describing the recipe "Chicken Parmesan," which is content associated with the app. In particular embodiments, the advertisement may be based on user information corresponding to one or more user nodes that are connected to the selected concept nodes. As an example and not by way of limitation, the advertisement directed towards a first user may comprise user profile pictures and names of the first user's social contacts (i.e., user nodes within a threshold degree of separation) whose corresponding user nodes having one or more edges connected to one or more of the concept nodes. It may also include how many times those social contacts have accessed the selected concept node, when they accessed it, how they are connected to the concept node (i.e., via a "like" edge, a "used" edge, etc.), or other suitable information associated with the user. In particular embodiments, the social-networking system may transmit to the first user the generated advertisement or information associated with the advertisement. The advertisement may be displayed directly or indirectly. The advertisement may be transmitted as an email, as an image, as a webpage, as a portion of a webpage, or in another suitable manner. Although this disclosure describes generating advertisements in a particular manner, this disclosure contemplates generating advertisements in any suitable manner.

Figure 5:
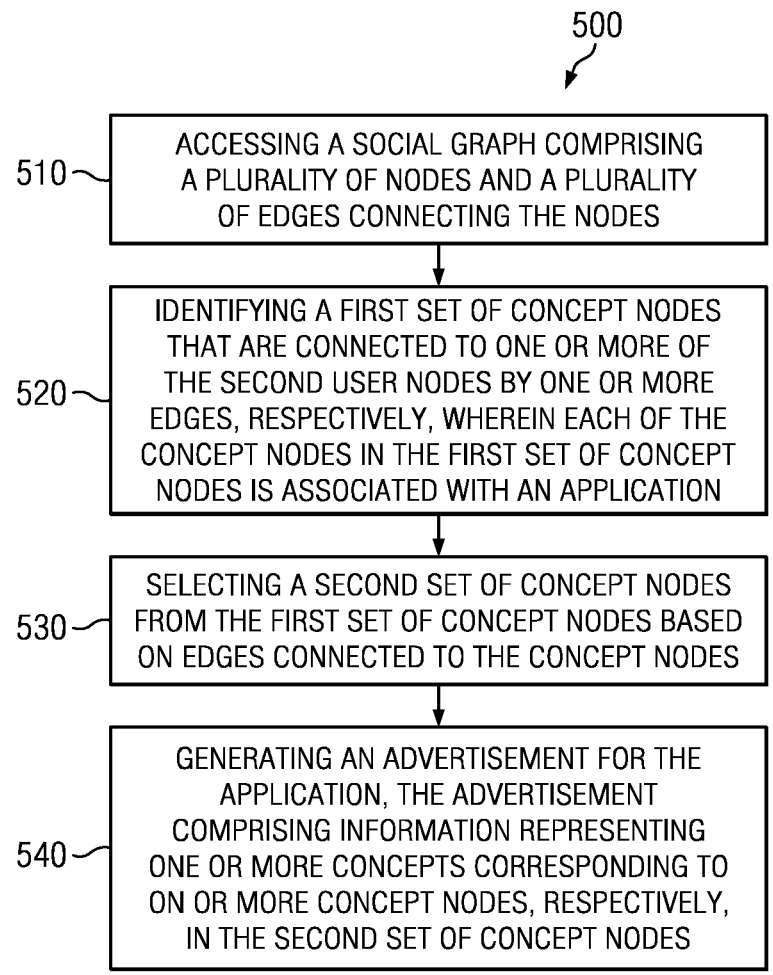
FIG. 5 illustrates an example method.

FIG. 5 illustrates an example method 500 for implementing particular embodiments. The method begins at step 510, where the social-networking system accesses a social graph comprising a plurality of nodes and a plurality of edges connecting the nodes. The plurality of nodes may comprise a first user node corresponding to a first user of an online social network and a plurality of second user nodes corresponding to a plurality of second users of the online social network, respectively. In particular embodiments, the second user nodes may be within a threshold degree of separation (such as, for example, one, two, three, or all) of the first user node. The plurality of nodes may also comprise one or more concept nodes corresponding to one or more concepts, respectively, wherein each concept node is connected to one or more user nodes by one or more edges. At step 520, the social-networking system may identify a first set of concept nodes that are connected to one or more of the second user nodes by one or more edges. Each of the concept nodes in the first set of concept nodes may be associated with an application accessible by users associated with the online social network. At step 530, the social-networking system may select a second set of concept nodes from the first set of concept nodes based on edges connected to the concept nodes. At step 540, the social-networking system may generate an advertisement for the application. The advertisement may include information representing one or more concepts corresponding to one or more concept nodes, respectively, in the second set of concept nodes. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components carrying out particular steps of the method of FIG. 5, this disclosure contemplates any suitable combination of any suitable components carrying out any suitable steps of the method of FIG. 5.

Figure 6:
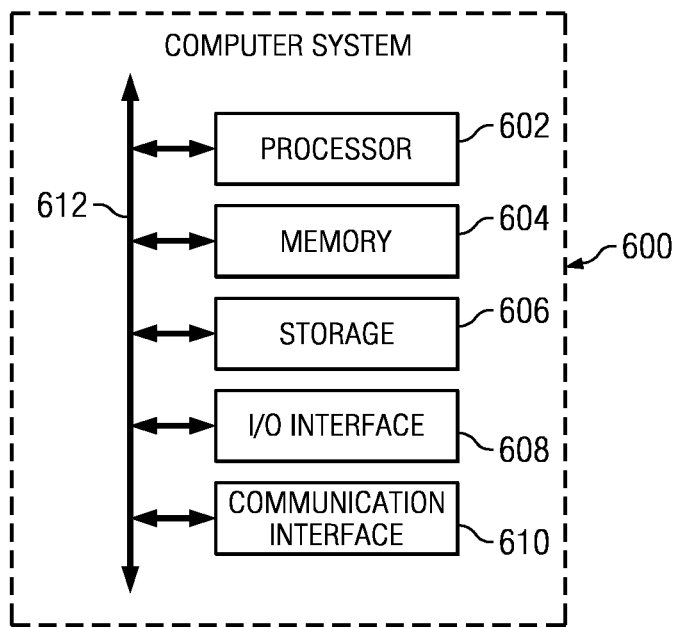
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate.

Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable non-transitory storage medium may include a semiconductor-based or other integrated circuit (IC) (such as, for example, a field-programmable gate array (FPGA) or an application-specific IC (ASIC)), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 7:
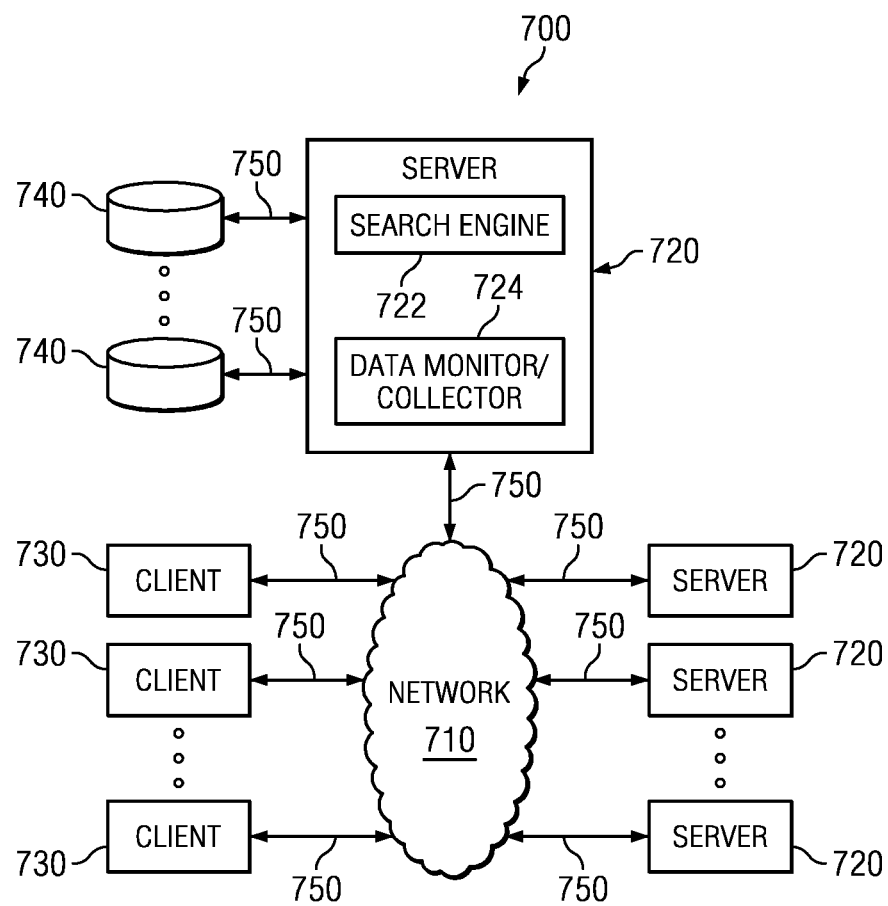
FIG. 7 illustrates an example network environment.

FIG. 7 illustrates an example network environment 700. This disclosure contemplates any suitable network environment 700. As an example and not by way of limitation, although this disclosure describes and illustrates a network environment 700 that implements a client-server model, this disclosure contemplates one or more portions of a network environment 700 being peer-to-peer, where appropriate. Particular embodiments may operate in whole or in part in one or more network environments 700. In particular embodiments, one or more elements of network environment 700 provide functionality described or illustrated herein. Particular embodiments include one or more portions of network environment 700. Network environment 700 includes a network 710 coupling one or more servers 720 and one or more clients 730 to each other. This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 couple servers 720 and clients 730 to network 710 or to each other. This disclosure contemplates any suitable links 750. As an example and not by way of limitation, one or more links 750 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 750. In particular embodiments, one or more links 750 each includes an intranet, an extranet, a VPN, a LAN, a WLAN, a WAN, a MAN, a communications network, a satellite network, a portion of the Internet, or another link 750 or a combination of two or more such links 750. Links 750 need not necessarily be the same throughout network environment 700. One or more first links 750 may differ in one or more respects from one or more second links 750.

This disclosure contemplates any suitable servers 720. As an example and not by way of limitation, one or more servers 720 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 720 includes hardware, software, or both for providing the functionality of server 720. As an example and not by way of limitation, a server 720 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 730, the web server may communicate one or more such files to client 730. As another example, a server 720 that operates as a mail server may be capable of providing e-mail services to one or more clients 730. As another example, a server 720 that operates as a database server may be capable of providing an interface for interacting with one or more data stores (such as, for example, data stores 740 described below). Where appropriate, a server 720 may include one or more servers 720; be unitary or distributed; span multiple locations; span multiple machines; span multiple datacenters; or reside in a cloud, which may include one or more cloud components in one or more networks.

In particular embodiments, one or more links 750 may couple a server 720 to one or more data stores 740. A data store 740 may store any suitable information, and the contents of a data store 740 may be organized in any suitable manner. As an example and not by way or limitation, the contents of a data store 740 may be stored as a dimensional, flat, hierarchical, network, object-oriented, relational, XML, or other suitable database or a combination or two or more of these. A data store 740 (or a server 720 coupled to it) may include a database-management system or other hardware or software for managing the contents of data store 740. The database-management system may perform read and write operations, delete or erase data, perform data deduplication, query or search the contents of data store 740, or provide other access to data store 740.

In particular embodiments, one or more servers 720 may each include one or more search engines 722. A search engine 722 may include hardware, software, or both for providing the functionality of search engine 722. As an example and not by way of limitation, a search engine 722 may implement one or more search algorithms to identify network resources in response to search queries received at search engine 722, one or more ranking algorithms to rank identified network resources, or one or more summarization algorithms to summarize identified network resources. In particular embodiments, a ranking algorithm implemented by a search engine 722 may use a machine-learned ranking formula, which the ranking algorithm may obtain automatically from a set of training data constructed from pairs of search queries and selected Uniform Resource Locators (URLs), where appropriate.

In particular embodiments, one or more servers 720 may each include one or more data monitors/collectors 724. A data monitor/collection 724 may include hardware, software, or both for providing the functionality of data collector/collector 724. As an example and not by way of limitation, a data monitor/collector 724 at a server 720 may monitor and collect network-traffic data at server 720 and store the network-traffic data in one or more data stores 740. In particular embodiments, server 720 or another device may extract pairs of search queries and selected URLs from the network-traffic data, where appropriate.

This disclosure contemplates any suitable clients 730. A client 730 may enable a user at client 730 to access or otherwise communicate with network 710, servers 720, or other clients 730. As an example and not by way of limitation, a client 730 may have a web browser, and may have one or more add-ons, plug-ins, or other extensions. A client 730 may be an electronic device including hardware, software, or both for providing the functionality of client 730. As an example and not by way of limitation, a client 730 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 730 may include one or more clients 730; be unitary or distributed; span multiple locations; span multiple machines; span multiple datacenters; or reside in a cloud, which may include one or more cloud components in one or more networks.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Furthermore, "a", "an," or "the" is intended to mean "one or more," unless expressly indicated otherwise or indicated otherwise by context. Therefore, herein, "an A" or "the A" means "one or more A," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, this disclosure encompasses any suitable combination of one or more features from any example embodiment with one or more features of any other example embodiment herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing systems:
   identifying, by the one or more computing systems, a plurality of third-party applications associated with an online social network, wherein each identified third-party application has one or more connections to users of the online social network;
   determining, by the one or more computing systems, for each identified third-party application, a value representing a social relevance of the third-party application, wherein the social relevance value is based on one or more connection factors associated with the one or more third-party application connections;
   selecting, by the one or more computing systems, one of the identified third-party applications based on its determined social relevance value; and
   generating, by the one or more computing systems, an advertisement for the selected third-party application.

2. The method of claim 1, wherein, for each identified third-party application, the connection factors comprise one or more of:
   the number of third-party application connections,
   the types of third-party application connections,
   the time the third-party application connections were created, or
   the relationships of the users connected to the third-party application.

3. The method of claim 1, wherein determining the social relevance value for each third-party application further comprises determining a connection factor value for each connection factor.

4. The method of claim 3, wherein each connection factor value is assigned a weighting multiplier.

5. The method of claim 1, further comprising:
   accessing a social graph comprising a plurality of nodes and a plurality of edges connecting the nodes, wherein each edge between two nodes represents a single degree of separation between the two nodes, the plurality of nodes comprising:
      a plurality of nodes corresponding to a plurality of users of the online social network, respectively, wherein a degree of separation between any two user nodes is a minimum number of edges required to traverse the social graph data from one user node to the other;
      a plurality of nodes corresponding to the plurality of third-party applications, respectively; and
      a plurality of nodes corresponding to a plurality of concepts, respectively.

6. The method of claim 5, wherein each third-party application connection corresponds to a first edge between a user node and a third-party application node.

7. The method of claim 6, wherein, for each identified third-party application, the connection factors comprise one or more of:
   the number of first edges,
   the types of first edges,
   the creation times of the first edges,
   the degrees of separation between the user nodes corresponding to the connected users, or
   the types of edges between the user nodes corresponding to the connected users.

8. The method of claim 6, wherein each edge between a user node and third-party application node represents an interaction with the corresponding third-party application.

9. The method of claim 8, wherein each interaction comprises accessing, creating, or managing one or more multimedia objects on the corresponding third-party application.

10. The method of claim 9, wherein the plurality of concepts corresponds to a plurality of multimedia objects, respectively, wherein each multimedia object is accessible on one or more of the third-party applications.

11. The method of claim 5, wherein each third-party application connection corresponds to a first edge between a user node and a concept node and a second edge between the concept node and a third-party application node.

12. The method of claim 11, wherein, for each identified third-party application, the connection factors comprise one or more of:
   the number of first edges,
   the types of first edges,
   the creation times of the first edges,
   the number of second edges,
   the types of second edges,
   the creation times of the second edges, the degrees of separation between the user nodes corresponding to the connected users, or the types of edges between the user nodes corresponding to the connected users.

13. The method of claim 11, wherein each first edge represents an interaction with the corresponding multimedia object on the corresponding third-party application.

14. The method of claim 12, wherein each interaction comprises accessing, creating, or managing the corresponding multimedia object on the corresponding third-party application.

15. The method of claim 1, further comprising:
sending, by the one or more computing systems, the generated advertisement to one or more users of the online social network.

16. The method of claim 1, wherein the advertisement comprises a structured document.

17. The method of claim 1, wherein the advertisement comprises a title, an image, ad copy, a display URL, a destination URL, or any combination thereof.

18. The method of claim 1, wherein the third-party applications are accessible by users of the online social network.

19. A system comprising: one or more processors; and a memory coupled to the processors comprising instructions executable by the processors, the processors operable when executing the instructions to:
identify a plurality of third-party applications associated with an online social network, wherein each identified third-party application has one or more connections to users of the online social network;
determine, for each identified third-party application, a value representing a social relevance of the third-party application, wherein the social relevance value is based on one or more connection factors associated with the one or more third-party application connections;
select one of the identified third-party applications based on its determined social relevance value; and
generate an advertisement for the selected third-party application.

20. One or more computer-readable non-transitory storage media embodying software that is operable when executed to:
identify a plurality of third-party applications associated with an online social network, wherein each identified third-party application has one or more connections to users of the online social network;
determine, for each identified third-party application, a value representing a social relevance of the third-party application, wherein the social relevance value is based on one or more connection factors associated with the one or more third-party application connections;
select one of the identified third-party applications based on its determined social relevance value; and
generate an advertisement for the selected third-party application.

* * * * *